R. L. GALLUP.
BOTTLE WASHING MACHINE.
APPLICATION FILED AUG. 31, 1911.

1,161,468.

Patented Nov. 23, 1915.
6 SHEETS—SHEET 4.

Witnesses.

Inventor.
Rockwell L. Gallup
Per Lintheum Belt & Feller
Attorneys.

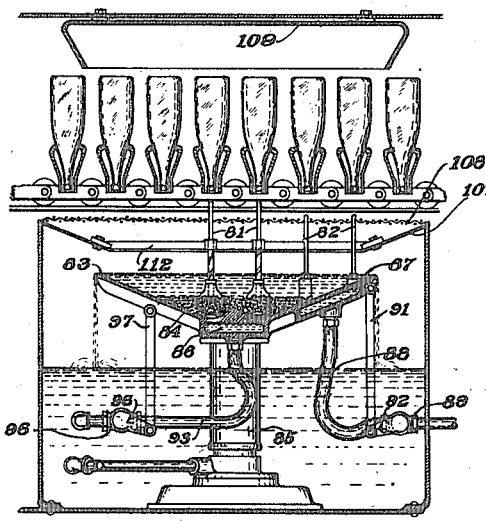
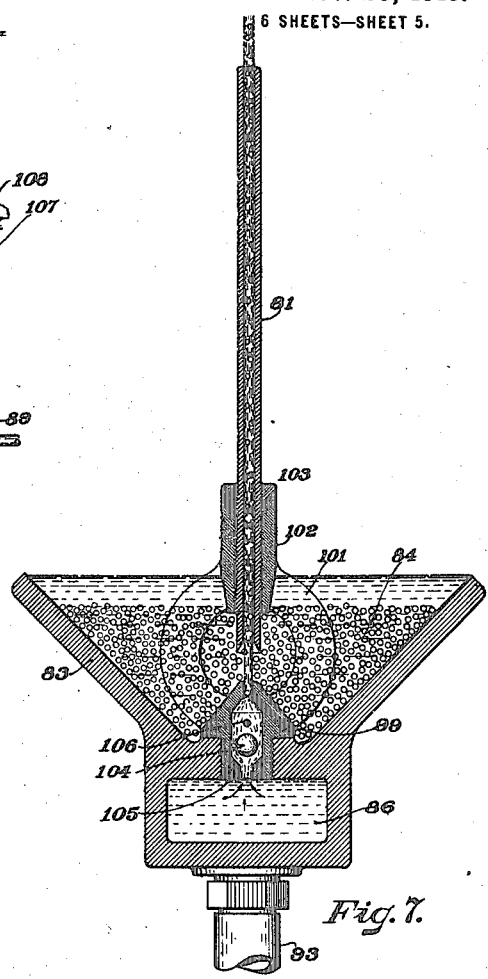
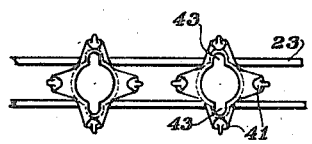
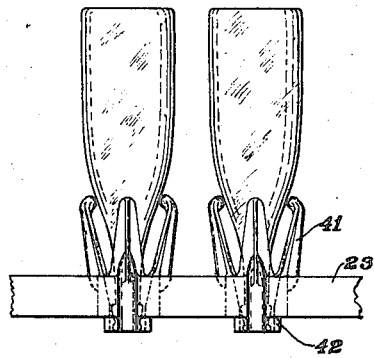

R. L. GALLUP.
BOTTLE WASHING MACHINE.
APPLICATION FILED AUG. 31, 1911.
1,161,468.
Patented Nov. 23, 1915.
6 SHEETS—SHEET 6.
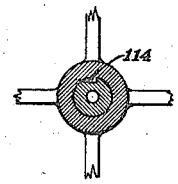
Fig. 11.
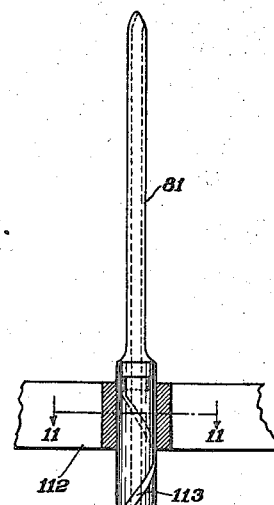
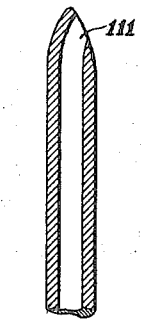
Fig. 12.
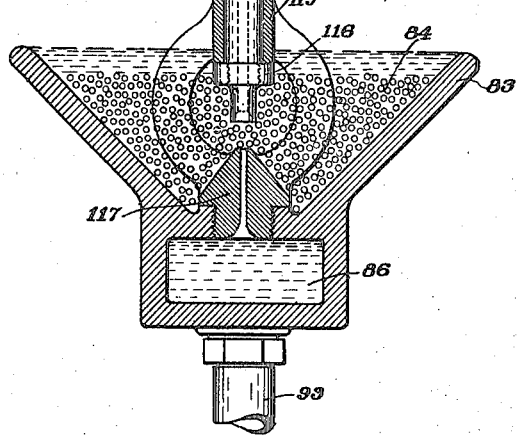
Fig. 10.
Witnesses.
Inventor.
Rockwell L. Gallup
Per Linthicum Belt Fellss
Attorneys.

UNITED STATES PATENT OFFICE.

ROCKWELL L. GALLUP, OF CHICAGO, ILLINOIS, ASSIGNOR, BY MESNE ASSIGNMENTS, TO BARRY-WEHMILLER MACHINERY COMPANY, OF ST. LOUIS, MISSOURI, A CORPORATION OF MISSOURI.

BOTTLE-WASHING MACHINE.

1,161,468.     Specification of Letters Patent.     Patented Nov. 23, 1915.

Application filed August 31, 1911. Serial No. 647,005.

*To all whom it may concern:*

Be it known that I, ROCKWELL L. GALLUP, a citizen of the United States, residing at Chicago, in the county of Cook and State of Illinois, have invented certain new and useful Improvements in Bottle-Washing Machines, of which the following is a specification.

This invention relates to bottle washing machines in which the bottles are carried through the machine and subjected successively to a series of soaking, washing and rinsing operations, and the principal object of the invention is the provision of a machine of this character which will remove all of the dirt and foreign matter from both the interiors and exteriors of the bottles and deliver the bottles thoroughly cleansed.

The invention embodies in its construction certain novel features of structure and operation, the purposes and many of the advantages of which will be apparent to those skilled in the art as the invention becomes better understood by reference to the following description when considered in connection with the accompanying drawings illustrating one preferred embodiment thereof.

Figure 1:
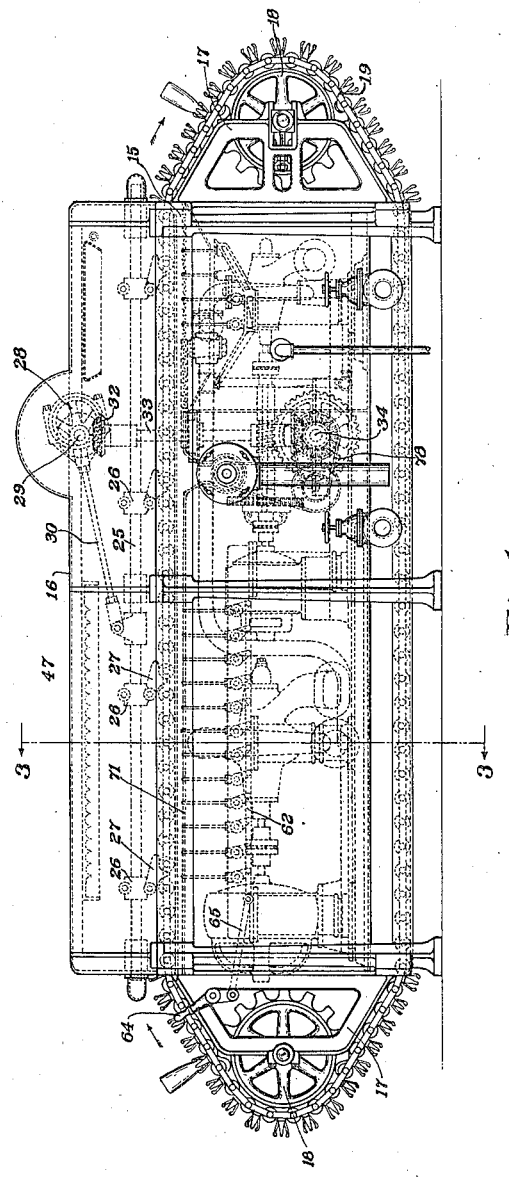
Figure 2:
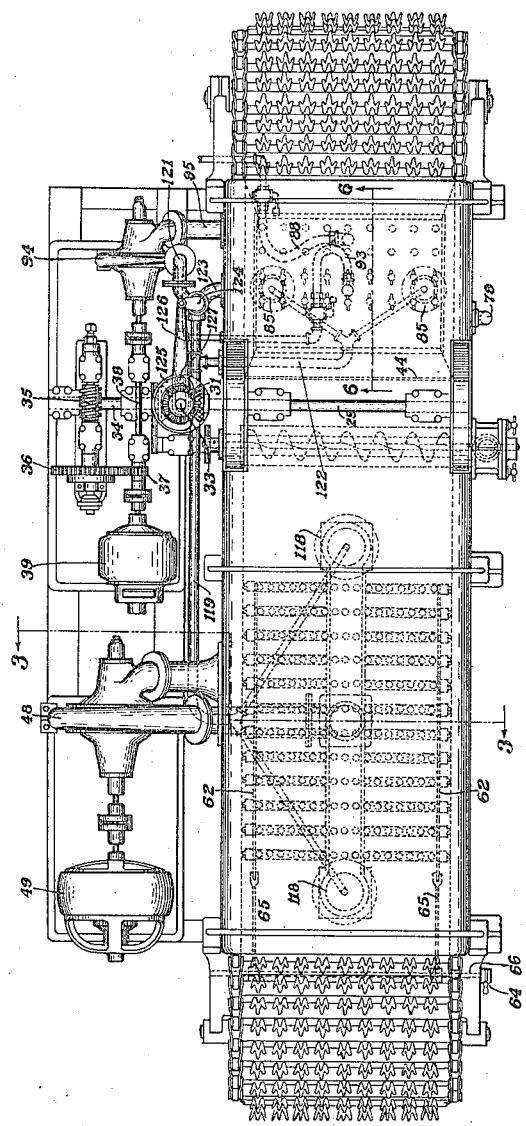
Figure 3:
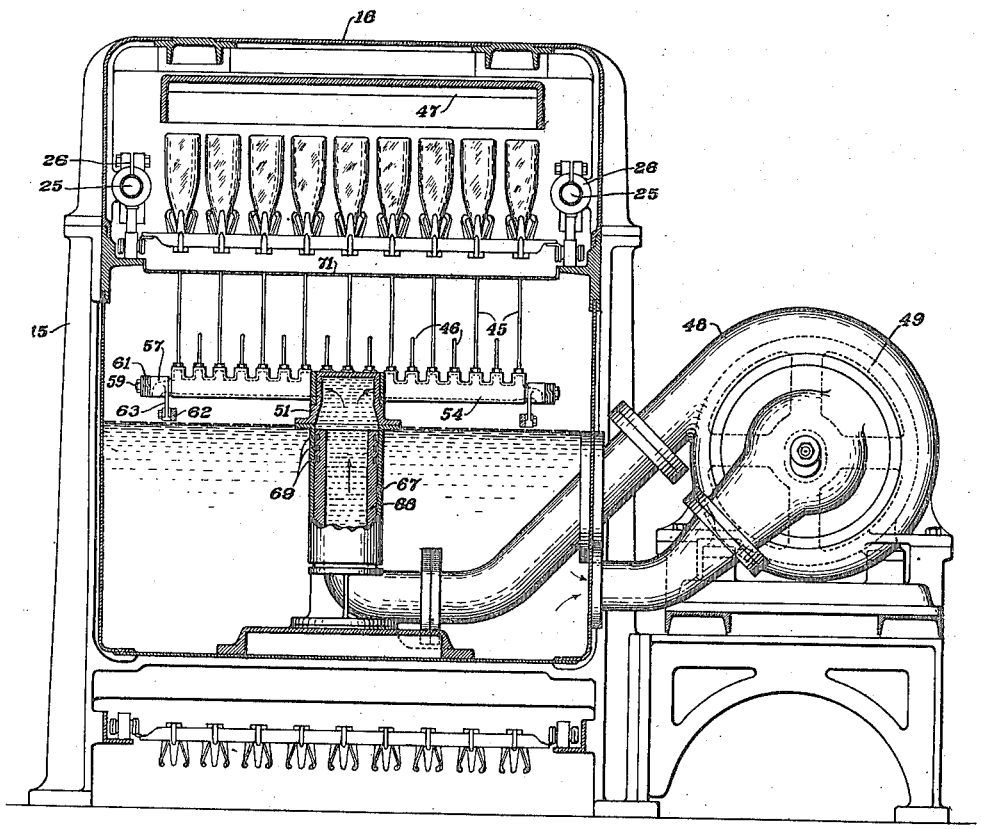
Figure 4:
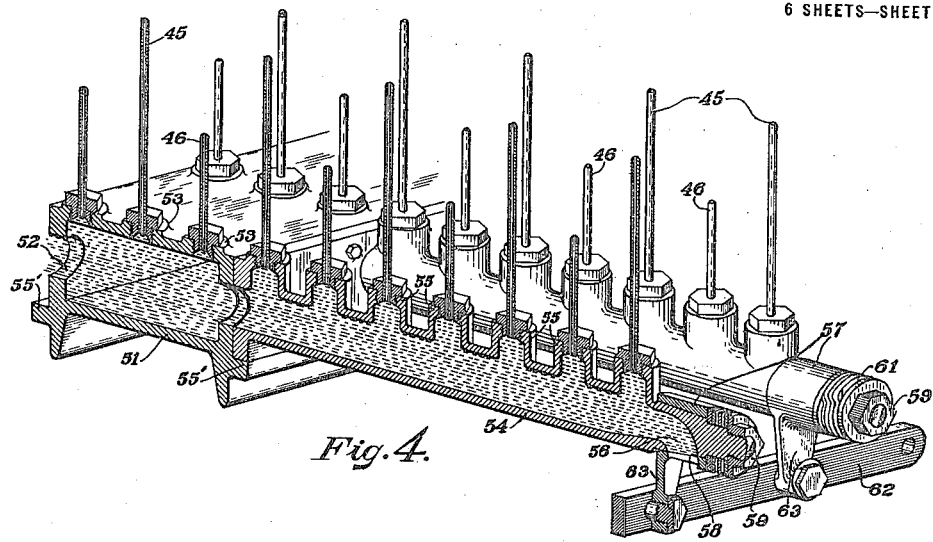
Figure 5:
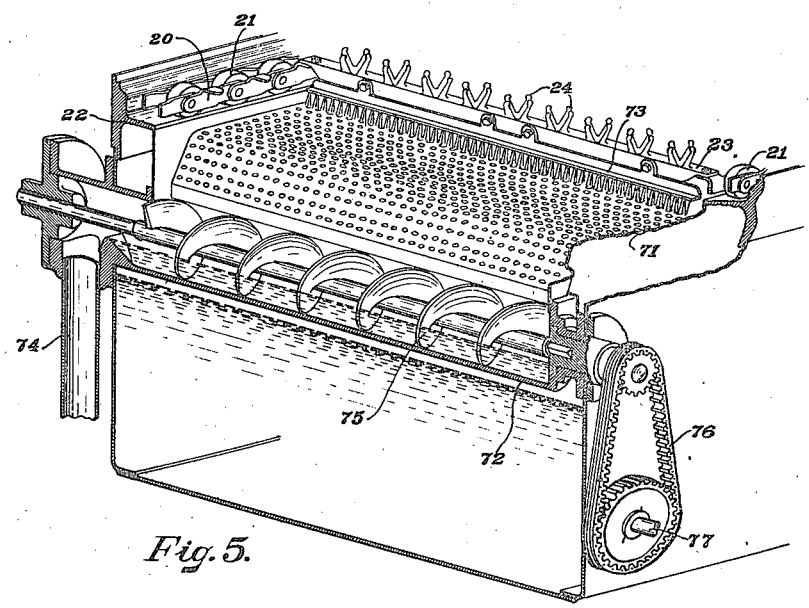

Referring to the drawings Figure 1 is a side elevation of a machine incorporating my invention. Fig. 2 is a plan view thereof. Fig. 3 is a transverse sectional view on the line 3—3 of Figs. 1 and 2. Fig. 4 is a fragmentary perspective view partially in section of the soaking header and branches equipped with soaking spindles. Fig. 5 is a fragmentary perspective view partially in section, showing the label-discharging conveyer. Fig. 6 is a transverse sectional view on the line 6—6 of Fig. 2. Fig. 7 is an enlarged detail view of one form of shotting spindle. Fig. 8 is a plan view of my improved bottle holding sockets. Fig. 9 is a side elevation thereof showing a bottle in position. Fig. 10 is an enlarged elevation of another form of shotting spindle showing the mechanism for rotating the same. Fig. 11 is a sectional view on the line 11—11 of Fig. 10; and Fig. 12 is an enlarged longitudinal sectional view of the delivery end of the spindle shown in Fig. 10.

From the drawings it will be observed that the machine comprises a main frame 15 capped by a hood 16 and provided at its ends with brackets 17 supporting the sprocket wheels 18, around and over which an endless bottle carrier 19 is adapted to travel. This carrier, as will be evident from Fig. 5, is composed of links 20 and rollers 21 adapted to travel along a track 22 and cross-bars 23 connecting the chains forming the sides of the carrier, said cross-bars being equipped with bottle receiving sockets 24 which will be described more in detail hereinafter. An intermittent movement in the direction of the arrows in Fig. 1 is imparted to the chain carrier by a pair of rods or bars 25 mounted in the hood 16 above the carrier to reciprocate longitudinally of the machine and provided at suitable intervals with clasps or clamps 26 upon which are pivotally mounted the dogs or fingers 27 shaped to engage with the cross-bars of the carrier and impart a forward movement thereto upon movement of the rods 25 to the right, viewing Fig. 1. The rods 25 may be equipped with as many of the dogs as may be deemed desirable or expedient and a sufficient number should be employed to impart a uniform tension to the upper portion of the carrier so that the cross-bars will be maintained a uniform distance apart. The operating rods 25 are actuated by eccentrics 28 mounted on a shaft 29 and connected with the rods by means of links 30. One end of the shaft 29 is provided with a bevel-gear 31 adapted to mesh and be driven by a similar bevel-gear 32 mounted on the upper end of an upright shaft 33 which is driven through the intermediary of suitable bevel-gears from the main horizontal driving shaft 34. This driving shaft may receive its motion from any suitable source of power but, in the present instance, I have shown it as provided at one end with a worm adapted to be driven by a screw 35 formed on an intermediary shaft which is driven at a reduced speed through the instrumentality of a gear 36 and a spur-gear 37 from the power shaft 38 connected with the motor 39.

It will be apparent that the driving mechanism described will impart a reciprocatory movement to the rods 25 by means of which the carrier will be intermittently fed forward to convey the bottles from the left or feed end (Fig. 1) of the machine, to the right or delivery end where they are removed manually or otherwise to be filled.

The bottle-receiving sockets 24 with which each of the cross-bars 23 of the carrier is equipped are designed to offer no obstruction to the removal of the labels from the bottles and, to this end, comprise a plurality, in the present instance four are shown (for the purposes of illustration) of tapered fingers 41 rising from a base or body 42 secured in the cross-bars. The extremities of the fingers 41 are spaced apart to permit the labels to pass therebetween, while at the same time they engage the bottles at the bases of the necks and retain them in inverted position to be operated upon by the various spindles and washing apparatus to which they are subjected in their passage through the machine. The base of the holders which project through the cross-bars are hollow, as shown in Fig. 6, to permit the entrance into the bottles of the water or other fluid delivered by the spindles located beneath the carrier and they are furthermore provided with grooves or passage-ways 43 located outside the perimeter of the bottle mouths to permit water delivered by the spindles to strike directly against the exteriors of the bottle necks so that the neck labels will also be removed. The removal of the neck labels from the bottles has, prior to my present invention, been a difficult and unsatisfactory proceeding, but, by the employment of sockets which permit the liquid delivered by the spindles as the bottles pass thereover to strike directly against the necks of the bottles, the removal of the neck labels is quickly and effectively accomplished.

The casing or body of the machine, formed by the sides, bottom and the top or cap 16, is divided into two compartments by a transversely extending partition 44 (Fig. 2) and the larger compartment or the compartment at the feed end of the machine is adapted to contain a quantity of what is commonly termed "soaking fluid" consisting preferably of an alkaline or acid solution of the required strength. In this compartment, which will be hereinafter referred to as the soaking compartment, are located the soaking spindles adapted to supply the soaking solution to both the interiors and exteriors of the bottles carried by the carrier. The spindles consist, as will be seen from Fig. 4, of alternately arranged long spindles 45 and short spindles 46, the long spindles being positioned and spaced to aline with the bottle-receiving sockets on the carrier and the short spindles being disposed between the sockets to deliver the soaking solution between the bottles against the interior of the top of the cap 16. A deflecting means consisting of a series of curved deflectors 47 is mounted in the cap 16 over the spindles so that the soaking fluid which is delivered by the spindles between the bottles is returned by these deflectors against the inverted bottoms of the bottles on the carrier to thoroughly wash and cleanse these bottoms. It will be evident from Fig. 1 that the width of each deflector is one-half the distance between the rows of spindles, this proportion having been found most desirable for the reason that the streams of soaking fluid will be deflected downwardly against the bottoms of the bottles at the most effective angle and position. The soaking solution is drawn from the soaking chamber and delivered by a pump 48 driven by any suitable motor 49 to a header 51 (Figs. 3 and 4). This header consists of a hollow chamber arranged longitudinally of the machine, provided with lateral perforations 52 and having threaded bosses 53 at its top into which are screwed a number of the soaking spindles. A series of hollow branches 54, each equipped at its upper side with bosses 55 threaded to receive the soaking spindles, is secured by bolts or other suitable fastening means to the sides of the header in alinement with the perforations 52 whereby communication is established between the interior of the header and the interior of the branches, so that soaking fluid will be delivered under pressure to all of the spindles. Each of the branches is preferably provided with a square flanged inner end adapted to fit against the side face of the header so that each branch may be secured in position or removed independently of the other branches. Ledges or shoulders 55' are preferably provided on the sides of the header to assist in positioning and supporting the branches.

The soaking fluid which is repeatedly circulated by the pump becomes in the course of time more or less laden with impurities and solid matter removed from the bottles and, as a result, there is a tendency of such solid matter to accumulate in the ends of the branches so that unless provision is made for cleaning out the branches such an accumulation of sediment would eventually stop up and clog the spindles. For the purpose of cleaning out the branches whenever it may be desirable, I have formed the end of each branch into an annular projection having a downwardly opening discharge passageway 56. A sleeve 57, formed to snugly fit this annular projection, is provided with a perforation 58 adapted to be alined with the passageway 56 through which any sediment or other solid matter collected in the branches will be blown off by the pressure of the soaking fluid therein. The sleeves are held in place by nuts 59 and are snugly retained in working position by spring washers 61 interposed between the sleeves and the nuts. All the blow-out or cleaning valves on each side of the header are preferably connected together by links 62 pivoted to arms 63 projecting radially from the sleeves 57 and any suitable mechanism, either automatic or manual, may be provided for actuating the links to open the valves. I have shown, for the purposes of illustration in the present instance, a hand-lever 64 (Fig. 1) pivoted to the frame of the machine and connected with the links 62 by connecting rods 65. If it is desired that all of the valves be opened simultaneously a cross-shaft 66 may be provided for simultaneously operating the connecting rods 65. The header is adapted to be raised and lowered to introduce the long spindles into the bottles at predetermined periods and the connection between the header and the discharge from the pump 48, therefore, comprises two telescoping tubes 67 and 68 provided with suitably interposed packing rings 69.

For the purpose of collecting and disposing of the labels which are removed from the bottles by the soaking solution, I have provided suitable mechanism, which is best shown in Fig. 5, for separating the removed labels from the soaking solution and discharging the separated labels at the side of the machine. With this end in view I have mounted in the soaking compartment a screen or perforated plate 71 upon which the labels fall as they are removed from the bottles, the perforations in the screen or plate being of such size as to permit the soaking solution to pass therethrough and drain back into the soaking chamber but to prevent the passage of the labels, so that the labels will be screened or strained out from the soaking solution and supported upon the screen. It will be manifest that the perforations in the screen must be large enough to permit the passage of the longer soaking spindles 45 therethrough and into the bottles. The screen 71 terminates at its right end (Figs. 1 and 2) in a depressed channel or duct 72 (Fig. 5) into which the labels collected on the screen 71 are brushed or scraped by brushes 73 mounted on the crossbars 23 of the conveyer. These brushes may be of any suitable construction and a sufficient number are attached to the carrier to brush the labels off from the screen 71 into the channel 72, from whence they are conveyed to a delivery spout 74, located at the side of the machine, by a screw conveyer 75 mounted in suitable bearings in the side frame of the machine and driven by means of a drive chain 76 from a shaft 77 which receives its motion by means of a drive chain 78 (Fig. 1) from the drive shaft 34.

The bottles travel on the carrier from the soaking compartment to what is termed the "washing compartment" at the delivery end of the machine at the right of the partition 44 (Fig. 1). This compartment is adapted to contain washing water as shown in Fig. 6 and is provided with an overflow pipe 79 (Fig. 2) which determines the height to which the water level may rise. In this washing compartment the bottles are subjected to two different operations, viz.: washing the interiors thereof with water under pressure carrying a quantity of solid material such as shot or the like and subsequently rinsing the bottles with clean fresh water. The shotting spindles 81 and the rinsing spindles 82 are carried by a hopper, designated generally as 83, adapted to contain a quantity of shot or the like 84, said hopper being carried but supported upon and raised and lowered by the hydraulic cylinders 85 in a manner hereinafter described. The hopper is provided with a centrally disposed washing chamber or compartment 86 upon which the shotting spindles are mounted and a laterally disposed chamber or compartment 87 with which the rinsing spindles 82 are connected. Fresh clean water under pressure is supplied to the chamber 87 through a pipe 88 connected with any suitable source of water supply such as a city main, for instance, and this water is admitted to the spindles 82 when the spindles are raised or introduced into the bottles, by the opening of a valve 89 located in the pipe 88 and operatively connected with the hopper 83 by a link 91 connecting said hopper with an operating arm or lever 92 of the valve. When the hopper is raised the valve is opened and water is admitted to the rinsing spindles and when the hopper is lowered to withdraw the spindles from the bottles the valve 89 is closed.

Washing water is supplied to the chamber 86 through a pipe 93 connected with the discharge of a force pump 94 which receives its water supply through an intake pipe 95 connecting with the interior of the washing compartment, so that the water in said compartment is delivered by the pump to the shotting spindles from whence it drops back into the washing compartment and is repeatedly used. A valve 96 is located in the pipe 93 and this valve, like the valve 89, is adapted to be opened upon raising movement of the hopper by means of a link 97 connecting said hopper with the arm or lever 98. It will thus be seen that, when the hopper is raised to introduce the shotting and rinsing spindles into the bottles, both valves 89 and 96 are opened to admit water under pressure to the shotting and rinsing spindles, and that, when the hopper is lowered, these valves will be closed and the water supply to the spindles will be consequently shut off.

The shotting spindles themselves may be of various types, either stationary or rotatably mounted, and as many rows or series of the spindles may be employed as is found to be necessary. In Figs. 2 and 6 I have shown two rows or series of shotting spindles and in Fig. 7, for purposes of illustrating the specific construction of one type of spindle, I have shown but one row. The general construction of the spindles is practically the same whether one or more rows is used and the number of rows will depend upon the type and width of hopper employed. Referring to Fig. 7 for a detailed explanation of one form of spindle, it will be seen that the bottom of the hopper 83 above the water chamber 86 is threaded to receive a nozzle 99 which projects upwardly into the hopper. A yoke 101 is formed preferably integrally with the nozzle 99 and forms an internally threaded bearing or support 102 for the spindle proper 81. A lock-nut 103 may be employed to retain the spindle in adjusted position. By loosening the nut the spindle may be adjusted toward or from the discharge orifice of the nozzle 99 so that an ejector action will result from the passage of the water under pressure from the nozzle into the spindle which will draw a quantity of the shot or the like into the spindle and deliver the same into the bottle being washed. For the purpose of preventing the shot from dropping through the nozzle into the compartment 86 and the pipe 93, I have provided a ball valve 104 adapted to drop against a removable seat 105 so that any shot which may drop into the nozzle when the water pressure is shut off can not fall on through into the water chamber 86. A pin or bar 106 is provided in the nozzle bore to prevent the ball valve from being forced against the discharge orifice of the nozzle and shut off the flow of water from the nozzle. The shot which is delivered to the bottles through the spindles will drop back into the hopper 83 where they may be used again and, to guide and direct the shot back into the hopper, I have provided an annular deflector or tapered flange 107 which overlaps the perimeter of the hopper 83 and insures the depositing of the shot back into the hopper. A screen 108 is preferably mounted just beneath the carrier to prevent any solid matter or pieces of labels which may be clinging to the bottles from dropping into the hopper where they might be liable to clog up the spindles. To prevent the shot from scattering and being dispersed in case it should be delivered against the top of the machine through an empty socket, I have provided a deflector 109 so shaped that any shot striking thereagainst will be deflected back into the hopper without being permitted to scatter and become lost. The spindle shown in Fig. 7 is adapted to be alternately introduced and withdrawn from the bottles and delivers the shot and water directly against the bottoms of the bottles, the curvature of the bottles being relied upon to distribute the shot throughout the interiors thereof.

In the modified form of spindle shown in Figs. 10, 11 and 12 the discharge orifice 111 of the spindle is turned to discharge at an angle so that the shot and water discharged from the spindle will be forced into the corners and against the sides of the bottles. In order to distribute the shot and water in the bottles and insure a perfect cleaning of the same, the spindle is adapted to be rotated during its introduction and removal from the bottle. As shown in Figs. 6 and 10, a spider or bar 112 extends across the center of the flange or inclined ledge 107 which serves as a guide for the spindle 81. The spindle shown in Fig. 10 is provided with a spiral groove 113 and the bar or spindle 112 is provided with an inwardly extending pin or projection 114 adapted to fit in the spiral groove and impart a rotary motion to the spindle when the same is raised and lowered. It will be understood that each of the guides and each of the spindles is thus equipped with a pin and groove connection so that all of the spindles will be simultaneously rotated upon their introduction into their respective bottles. The bearings 115 for the spindles are formed to permit rotation of the spindles and the locking nut 116 is provided to prevent the spindles from becoming displaced from the bearings. The nozzle 117 in this instance, is not provided with a ball valve to prevent the shot or the like contained in the hopper 83 from dropping therethrough, but a valve may be employed, if desirable, or the bore of the nozzle and the size of the shot may be so proportioned that a valve will not be necessary. When this type of spindle is employed the shot and water will be delivered against the sides of the bottles with a spiral swirling motion which is found to be very effective in removing any particles clinging to the walls or bottoms of the bottles. The hopper 83 carrying the shotting and rinsing spindles and the header 51 carrying the soaking spindles, are both mounted upon hydraulic cylinders 85 and 118, respectively, and these cylinders are automatically controlled so that all of the spindles are simultaneously raised and lowered together. A pipe 119 is connected with the discharge pipe 121 of the pump 94 and is branched at its extremity to connect with both of the hydraulic cylinders 118. A similar pipe 122 leads from pipe 119 and is branched to communicate with the hydraulic cylinders 85 upon which the hopper 83 is mounted. A branch pipe 123 also connects pipe 119 with the washing chamber or compartment. A three-way valve 124 is mounted at the union of pipes 119, 121 and 123, so that in one position of the valve, pipe 123 will be shut off and pipes 119 and 121 will be in communication, whereby water under pressure from pump 94 will be delivered simultaneously to the hydraulic cylinders 85 and 118 to simultaneously raise the soaking spindles and the shotting and rinsing spindles. When valve 124 is turned to its other position, the discharge pipe 121 is closed and pump 94 runs idly while the water from the cylinders 85 and 118 flows through pipes 119 and 123 into the washing compartment, thus permitting all of the spindles to be simultaneously lowered under the influence of gravity. The valve 124 is automatically controlled in its operation by a cam 125 mounted upon the vertically disposed shaft 33 and which is connected with the valve 124 by a link 126 provided with a follower 127 which travels in the groove of the cam 125. The valve is thus automatically operated to direct water under pressure to the hydraulic raising cylinders and to subsequently permit the water to be discharged therefrom into the washing compartment.

In the operation of my present invention the soaking solution contained in the soaking compartment is delivered to the soaking spindles by the pump 48 from whence it is discharged over the interiors and exteriors of the bottles and subsequently drains back into the soaking comparting to be repeatedly used. The shotting spindles are supplied with water from the washing compartment by the pump 94 which also forces the same water under pressure into the hydraulic cylinders for simultaneously raising and lowering the soaking, shotting and rinsing spindles. This washing water is also repeatedly used but the rinsing spindles receive their water from an independent fresh water supply so that the last rinsing of the bottles is done with clean fresh water. The lables which are removed from the bottles in the soaking compartment are collected on the label screen, from whence they are brushed or scraped by the brushes mounted on the bottle carrier into the transversely extending channel, from whence they are delivered to the exterior of the machine by the continously rotating screw conveyer. While the soaking solution is delivered in continuous streams from the soaking spindles, the shotting and rinsing spindles deliver water intermittently only, the delivery being timed to take effect when the spindles are introduced into the bottle, and the water supply to the spindles is automatically controlled by the raising and lowering of the hopper upon which they are mounted. The automatic mechanism for raising and lowering all of the spindles is so timed with relation to the carrier feeding mechanism that the spindles will be lowered at each successive forward movement of the carrier.

It is believed that the construction, operation and many advantages of my present invention will be understood from the foregoing without further description, and it will be apparent that various changes in the size, shape, proportion, construction and arrangement of the various parts may be resorted to without departing from the spirit of the invention or sacrificing any of the material advantages thereof.

I claim:—

1. In a bottle washing machine, the combination of a plurality of washing spindles, means for supplying washing fluid thereto, a carrier adapted to position a plurality of bottles successively over said spindles, and a plurality of curved deflectors, each narrower in width than the spacing between the washing spindles, located upon the opposite side of the carrier from the spindles to deflect upon the exteriors of the bottle washing fluid delivered between the bottles by said spindles whereby the exteriors of the bottles are cleansed.

2. In a bottle washing machine, the combination of a carrier, means for imparting an intermittent movement thereto, a plurality of long spindles adapted to be inserted in the bottles disposed in said carrier, a plurality of short spindles arranged in alternation with the long spindles and adapted to discharge upwardly between the bottles, means for supplying washing fluid to all of said spindles, and deflecting means, comprising a series of semi-circular deflectors, positioned above the bottles on the carrier in alinement with the spindles to deflect the washing fluid delivered by said spindles between the bottles over the bottoms of said bottles to cleanse the same.

3. In a bottle washing machine, the combination of a carrier adapted to carry a plurality of bottles in inverted position, spindles located adjacent said carrier, means for supplying water to said spindles, and a plurality of semi-circular deflectors positioned to deflect water delivered by said spindles over the exteriors of the bottles on the carrier.

4. In a bottle washing machine, the combination of means for removing labels from bottles, a bottle support disposed adjacent said means, and bottle sockets mounted on the support to carry bottles in inverted position, each of said sockets comprising a plurality of rigid bottle holding fingers spaced apart to permit the passage therebetween of the labels removed from the bottles and having converging extremities adapted to engage a bottle above the neck only.

5. In a bottle washing machine, the combination of means for removing labels from bottles, a carrier, and sockets mounted thereon to support the bottles in inverted position, each of said sockets having fingers adapted to engage a bottle above the neck only and hold the same without obstructing the removal of labels therefrom.

6. In a bottle washing machine, the combination of a plurality of spindles, a carrier arranged to travel adjacent said spindles, and a plurality of bottle holding sockets mounted on said carrier, each socket comprising a base provided with an annular opening to permit the delivery of washing fluid from said spindles to the interior of a bottle and provided with grooves or passageways adapted to permit the delivery of washing fluid from said spindles to the exterior of the neck of a bottle.

7. In a bottle washing machine, the combination of a plurality of bottle carrying sockets each comprising a base provided with an opening for the passage of washing fluid delivered to the interiors of the bottles and with passageways for fluid delivered to the exteriors of said bottles and tapered bottle holding fingers spaced apart at their extremities to permit the removal of the labels from the bottles, and means for delivering fluid to the bottles positioned in said sockets.

8. In a bottle washing machine, the combination of a bottle carrier, a label collecting screen disposed therebeneath, means mounted on the carrier for removing the labels from said screen, and means disposed transversely of the screen for discharging said labels from the machine at one side thereof.

9. In a bottle washing machine, the combination of a carrier, means for removing the labels from the bottles mounted in said carrier, a screen for collecting said removed labels, a conduit, a plurality of brushes mounted on the carrier adapted to convey the removed labels from the screen into the conduit, and means for discharging the labels from the conduit at the side of the machine.

10. In a bottle washing machine, the combination of a bottle carrier, a label collecting screen, a plurality of brushes mounted on the carrier to travel across said screen to remove the labels therefrom, a worm for conveying the removel labels to the exterior of the machine, and mechanism for operating said worm.

11. In a bottle washing machine, the combination of a rotatably mounted spindle provided with a laterally opening discharge orifice, a hopper disposed beneath said spindle and adapted to contain shot, or the like, a nozzle mounted in said hopper in alinement with the lower end of said spindle, means for supplying liquid under pressure to said nozzle whereby a quantity of said liquid and a quantity of the shot, or the like, is discharged through the spindle, and means for rotating the spindle whereby the water and shot are discharged against the inner walls of a bottle.

12. In a bottle washing machine, the combination of a hopper adapted to contain shot, or the like, a nozzle mounted therein, a yoke provided with a bearing, a spindle mounted in said bearing, means for raising and lowering said hopper, and means adapted to be actuated upon raising movement of the hopper to admit liquid under pressure to said nozzle whereby said liquid and a quantity of the shot, or the like, are delivered through said spindle to the interior of a bottle being washed.

13. In a bottle washing machine, the combination of a hopper adapted to contain shot, or the like, a nozzle mounted in the bottom thereof, a valve arranged in said nozzle to prevent the passage of shot therethrough, a spindle mounted in alinement with said nozzle but spaced therefrom, a pipe for conveying water under pressure to said nozzle, a valve disposed in said pipe, connections between said valve and said hopper, and means for raising said hopper whereby the valve controlled by said hopper is opened to permit liquid under pressure to be discharged through said spindle.

14. In a bottle washing machine, the combination of a hopper adapted to contain shot, or the like, a shotting spindle mounted therein, means for supplying liquid under pressure to said spindle whereby said liquid together with shot, or the like, are discharged through said spindle, a rinsing spindle carried by said hopper, means for supplying rinsing water under pressure to said spindle, automatic mechanism for raising said hopper to introduce said spindles into the bottles to be cleansed, and means connected with said hopper for admitting the liquid under pressure to said spindles when the hopper is raised and shutting off the liquid when the hopper is lowered.

15. In a bottle washing machine, the combination of a hopper provided with a plurality of passageways, a shotting spindle connected with one of said passageways, a rinsing spindle connected with the other passageway, a pump connected with one of said passageways for supplying water under pressure to the shotting spindle, a pipe connected with a suitable source of water supply for supplying water under pressure to the rinsing spindle, means for automatically raising said hopper, and means governed by the raising and lowering mo ements of the hopper for controlling the supply of water to said spindles.

16. In a bottle washing machine, the combination of a hopper adapted to contain shot and provided with a centrally arranged water chamber, a plurality of shotting spindles communicating with said chamber, a second water chamber formed in said hopper, a plurality of rinsing spindles connected with said second chamber, and means for intermittently supplying water under pressure to both of said chambers.

17. In a bottle washing machine, the combination of a hopper adapted to contain shot, hydraulic means for automatically and intermittently raising said hopper, a plurality of shotting spindles and a plurality of rinsing spindles carried by the hopper, independent water chambers formed in said hopper and communicating with said shotting spindles and said rinsing spindles, respectively, means for supplying water under pressure to both of said chambers, and valves governed by the position of said chambers for controlling the admission of water to said chambers.

18. In a bottle washing machine, the combination of a hopper provided with a plurality of independent water chambers, means for intermittently and automatically raising and lowering said hopper, shotting spindles and rinsing spindles connected respectively with said chambers, independent pipes for supplying water under pressure to said chambers, valves located in said pipes, and links connecting said valves with the hopper whereby said valves will be opened upon raising movement of the hopper and closed upon lowering movement thereof.

19. In a bottle washing machine, the combination of a carrier, a plurality of reciprocatory shotting spindles mounted adjacent said carrier, means for introducing said spindles into bottles mounted on said carrier, means for forcing liquid, shot, or the like, through said spindles into the bottles, a receptacle adapted to contain shot and surrounding said spindles, and a guard for directing the shot discharged from the bottles back into said receptacle.

20. In a bottle washing machine, the combination of a carrier, a plurality of shotting spindles mounted adjacent said carrier, means for introducing said spindles into the bottles disposed on the carrier, stationary means for rotating said spindles as they are introduced into the bottles, a shot containing receptacle surrounding said spindles, means mounted above the carrier for preventing the dispersion of shot delivered from the spindles, and a guard mounted below the carrier for conducting said shot back into said receptacle.

21. In a bottle washing machine, the combination of a series of soaking spindles, a pump for supplying soaking fluid under pressure to said spindles, a series of shotting spindles, hydraulic cylinders upon which said soaking spindles and shotting spindles are supported, a pump connected to supply liquid under pressure to said hydraulic cylinders and to said shotting spindles, automatic mechanism for intermittently admitting liquid under pressure from said pump to said cylinders to raise all of said spindles simultaneously, and mechanism for automatically admitting liquid under pressure from said pump to the shotting spindles upon raising movement of said spindles.

22. In a bottle washing machine, the combination of a series of soaking spindles, a series of rinsing spindles, independent means for supplying liquid under pressure to each of said series of spindles, a carrier, means for intermittently actuating said carrier to position a bottle successively over each series of spindles, hydraulic mechanism for raising and lowering all of said spindles, and automatic controlling means for said hydraulic mechanism whereby all of the series of spindles are simultaneously raised and lowered.

23. In a bottle washing machine, the combination of a machine frame, washing mechanism mounted therein, an endless conveyer comprising a plurality of cross-bars provided with bottle carrying sockets, a longitudinally slidable rod mounted adjacent to said conveyer, means for reciprocating said rod, and dogs pivotally mounted on said rod at intervals and adapted to engage with said conveyer whereby the conveyer is intermittently advanced upon reciprocation of said rod to position each row of bottles successively above the rows of washing spindles.

24. In a bottle washing machine, the combination of a frame, an endless conveyer carried thereby, a plurality of rows of bottle washing spindles mounted beneath said conveyer, bottle sockets mounted on the conveyer, a reciprocatory rod, dogs carried by said rod and spaced apart thereon, said dogs being adapted to engage the conveyer at intervals, and means for reciprocating said rod to intermittently advance the conveyer and position the bottle sockets over said washing spindles.

ROCKWELL L. GALLUP.

Witnesses:
  IRA J. WILSON,
  M. ROBERTSON.